May 24, 1938.  H. W. MEADE  2,118,516
CARBURETOR
Filed July 27, 1934   2 Sheets-Sheet 1
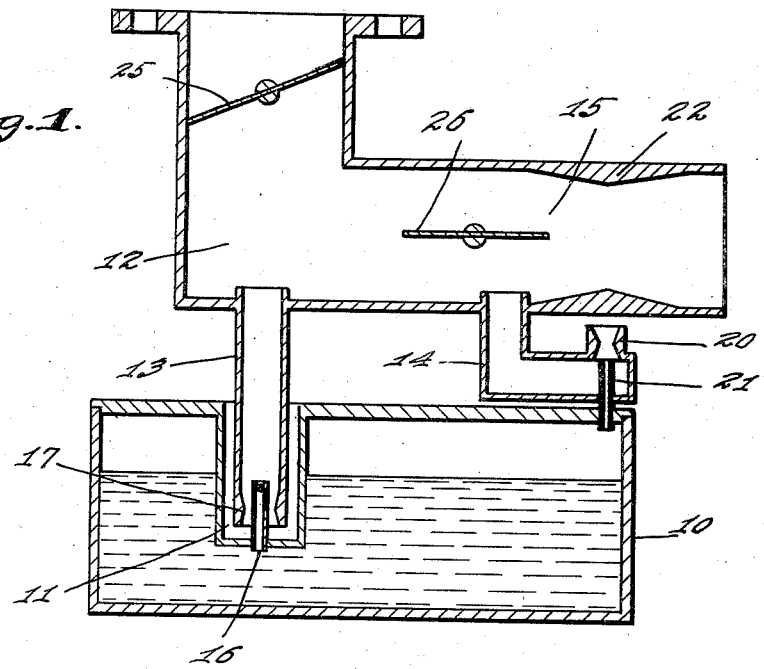
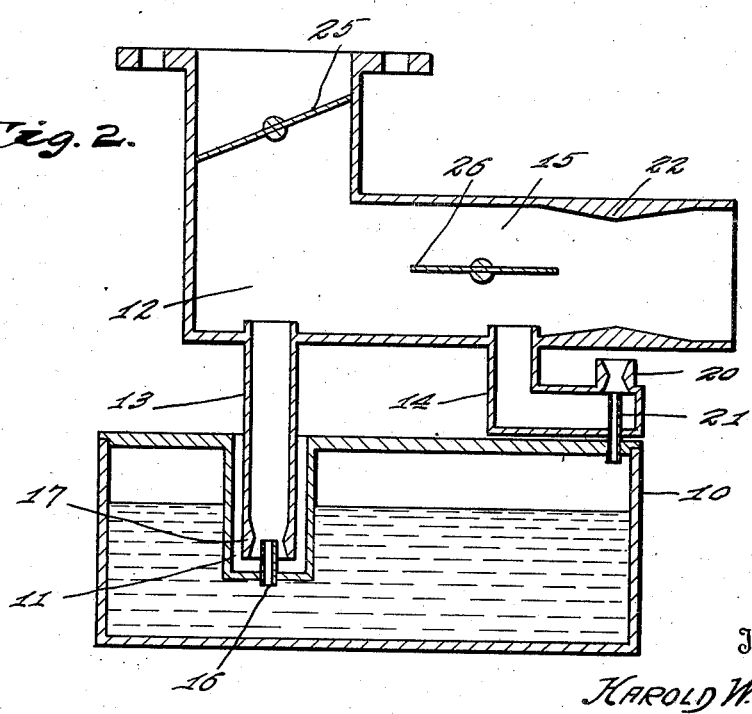
Inventor
HAROLD W. MEADE,
By
Attorneys May 24, 1938.   H. W. MEADE   2,118,516
CARBURETOR
Filed July 27, 1934   2 Sheets-Sheet 2
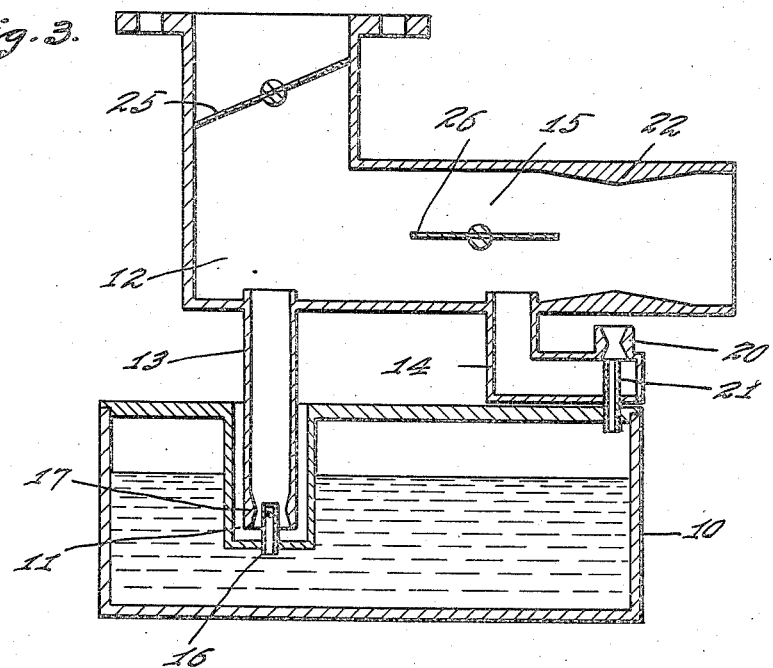
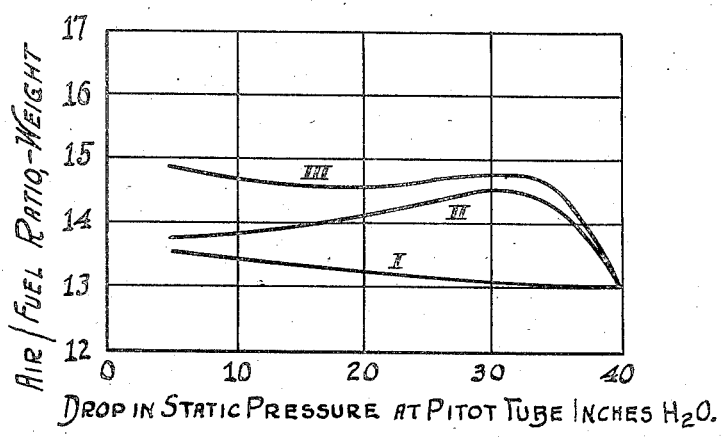

Patented May 24, 1938

2,118,516

UNITED STATES PATENT OFFICE 2,118,516

CARBURETOR

Harold W. Meade, Covington, Ind.

Application July 27, 1934, Serial No. 737,267

6 Claims. (Cl. 261—121)

My invention relates to carburetors for use in association with internal combustion engines, and it is my primary object to provide a carburetor having desirable mixture-producing characteristics over an extended range of engine speeds. A further object of my invention is to produce a carburetor in which the feeding of fuel from the float bowl will be obtained without the necessity for venting the float bowl to atmosphere. A still further object of my invention is to provide a carburetor in which the fuel jet may be located at or below the normal running fuel level in the float bowl without the loss of fuel when the engine is not operating.

In carrying out my invention, I obtain the differential pressure necessary to maintain fuel flow by the use of an impact tube which is located in the intake conduit of the engine and which communicates with the carburetor float-bowl above the liquid level therein, and I mount the fuel jet at some point in the intake conduit where the effective pressure to which it is subject will be less than the total pressure exerted upon the impact tube. Preferably, the intake conduit of the engine has a branched inlet, the impact tube being located in one branch and the fuel jet in another. To permit the fuel jet to discharge at a point below the level of fuel in the float bowl while still avoiding loss of fuel when the engine is not operating, I dispose that branch of the intake conduit which contains the fuel jet in a well which extends well below and above the fuel level in the float bowl. The well is of a diameter larger than that of the branch of the intake conduit which it contains to provide an annular space through which air may flow downwardly to the inlet end of such branch.

The accompanying drawings illustrate my invention: Fig. 1 is a diagrammatic vertical section illustrating one form of carburetor in which my invention is embodied; Figs. 2 and 3 are similar views illustrating slightly modified arrangements; and Fig. 4 is a chart illustrating graphically the drainages in mixture proportions which accompany changes in operating conditions.

The carburetor illustrated in the drawings has the usual float bowl 10, the cover of which is provided with a depending portion forming an upwardly opening well 11, the bottom of such well being located well below the running fuel level in the float bowl 10.

The carburetor also has an intake conduit 12 through which the mixture of air and fuel created by the carburetor passes on its way to the engine. The passage 12 is shown as having three inlet branches 13, 14, and 15, but this branched construction is not necessary. If the branched construction is used, the inlet branch 15 may supply the bulk of the air used in forming the mixture and may therefore be larger than either of the other two inlet branches 13 and 14.

The inlet branch 13 is arranged vertically and extends from the passage 12 downwardly into the well 11, terminating above the bottom of the well. The branch 13 has a diameter considerably less than that of the well in order that air may flow downwardly through the annular space between the branch and the walls of the well to enter the lower end of the branch. A fuel-discharge jet 16, in communication with the interior of the float-bowl 10, projects through the bottom of the well 11 and upwardly into the open lower end of the inlet-branch 13 which, at its lower end, has a venturi 17 of any customary form.

The inlet branch 14 is also provided with a venturi 20 and has arranged within it an impact tube 21 communicating with the interior of the float bowl above the normal level of fuel therein, the impact tube 21 opening in the branch 14 in a direction opposite to that of air flow therethrough.

Conveniently, the inlet branch 15, like the branches 13 and 14, has a venturi 22, although it may, if desired, have flow-impeding means of different form. I believe it is preferable, however, to provide each inlet branch with a venturi and to make these venturis of similar proportions in order that pressure conditions at corresponding points in the respective branches will undergo corresponding changes when the rate of flow through the passage 12 varies.

Near its discharge end, the passage 12 may be provided with the usual throttle valve 25. The carburetor may also embody a choke valve 26, preferably located on the engine side of the point where the branches 14 and 15 join. When the choke valve 26 is closed, no air will enter the branches 14 and 15 and a relatively rich mixture will thereby be produced for starting purposes when the engine is cold.

As so far set forth, the description applies to all three carburetors shown in the drawings, the only difference in the three modifications being the location and direction of discharge of the fuel nozzles 16. In Fig. 1 the fuel nozzle discharges laterally at a point beyond the venturi 17. In Fig. 2, the fuel nozzle discharges longitudinally of the inlet-branch 13 in the direction of flow therethrough and is disposed with its discharge opening substantially at the throat of the venturi 17. In Fig. 3, the location of the discharge nozzle 16 is the same as that shown in Fig. 2, but the nozzle is arranged to discharge laterally of the branch 13 instead of longitudinally thereof.

In each of the three carburetors shown in the drawings, the impact tube 21 has the same location, its opening being disposed in the inlet branch 14 beyond the venturi 20. Also in each carburetor shown, the float in the float bowl 10 is so arranged as to maintain the fuel level in the float bowl, when the engine is running, at a point slightly above the discharge opening of the discharge jet 16, thus tending to compensate for the friction opposing fuel flow through the discharge nozzle.

When the engine is not running, fuel rises in the well 11 to a level corresponding to that within the float bowl 10; but as soon as the engine is turned over, this fuel is aspirated upwardly through the branch inlet 13 into the passage 12, thus constituting a priming charge aiding the starting of the engine. After this extra quantity or priming charge of fuel has been drawn out of the well 11, the well remains substantially dry as long as the engine operates; for all the fuel discharged from the discharge nozzle 16 will be drawn upwardly by the upwardly moving air in the branch 13.

It is to be noted that the space above the liquid level in the float bowl 10 is substantially sealed against communication with the atmosphere. As a result, the pressure obtaining within the float bowl is substantially the sum of impact pressure and static pressure at the opening of the impact tube 21. The rate of fuel discharge, therefore, will depend upon the difference between pressure within the float bowl and the effective pressure at the outlet of the discharge nozzle 16. In Figs. 1 and 3, this latter pressure is the static pressure at the point where the opening of the discharge nozzle 16 is located; but in the carburetor shown in Fig. 2, the effective pressure will be lower than static pressure because of the fact that the discharge nozzle discharges in the same direction as air flow through the inlet branch 13.

In Fig. 4, I have illustrated curves showing the mixtures produced by the three carburetors illustrated in Figs. 1, 2, and 3 under varying conditions. In these curves, the ratio of air to fuel (by weight) is plotted against pressure drop (measured by inches of water) at the impact tube, such pressure drop being a function of throttle position. It is to be noted that in each of the carburetors a decrease in the richness of the mixture occurs at intermediate and low engine speeds. This is a very desirable characteristic in carburetors, since an engine will operate satisfactorily with a leaner mixture under intermediate load and speed conditions than it will when maximum power is demanded of it.

To facilitate desired flexibility of engine operation, it may be necessary to equip the carburetor with some form of idling device to increase the richness of the mixture supplied at idling speeds. I have not shown such a device in the drawings, because devices of the kind are old and well known and may not be necessary under all circumstances.

I claim as my invention:

1. In a carburetor, a float-bowl, a passage for air and fuel, a fuel jet for supplying fuel to air flowing through said passage, a choke valve in said passage, and an impact tube disposed in said passage and opening therein in a direction opposite to that of flow therethrough and at a point between the choke-valve and the inlet of said passage, said impact tube communicating with said float-bowl above the level of fuel therein.

2. The invention set forth in claim 1 with the addition that said passage is provided with a constriction between said impact tube and the inlet of the passage.

3. In a carburetor, a float-bowl, a passage for a mixture of air and fuel, said passage having a branched inlet the two branches of which receive air at equal pressure, a fuel jet in one of the inlet branches of said passage, and an impact tube in another of the inlet branches of said passage, said impact tube opening within its associated branch of said passage in a direction opposite to that of flow therethrough and communicating with said float-bowl above the level of fuel therein.

4. In a carburetor, a float-bowl, a passage for a mixture of air and fuel having a constriction near its inlet end, the inlet end of said passage communicating with the atmosphere to receive air at atmospheric pressure, a fuel jet for delivering fuel to air flowing through said passage, and an impact tube disposed in said passage beyond said constriction in the direction of flow through said passage and opening in a direction opposite to that of flow therethrough, said impact tube communicating with said float-bowl above the level of fuel therein.

5. In a carburetor, a chamber containing liquid fuel at constant level, a passage for a mixture of air and fuel, the inlet end of said passage communicating with the atmosphere to receive air at atmospheric pressure, means for controlling the pressure above the fuel in said chamber solely in accordance with the combined impact and static pressures at a point in said passage, and a fuel jet for delivering fuel to air flowing through said passage and discharging at a point where the static pressure is substantially equal to that at said first named point.

6. In a carburetor, a chamber containing liquid fuel at constant level, a passage for a mixture of air and fuel, the inlet end of said passage communicating with the atmosphere to receive air at atmospheric pressure, a fuel jet for supplying fuel to air flowing through said passage, and means for controlling the pressure above the fuel in said chamber solely in accordance with the combined impact and static pressures at a point in said passage, said passage being provided with a constriction between the inlet opening and said point.

HAROLD W. MEADE.